United States Patent [19]

Drent

[11] Patent Number: 5,061,785
[45] Date of Patent: Oct. 29, 1991

[54] POLYMERIZATION OF CARBON MONOXIDE/OLEFIN WITH TERTIARY ALIPHATIC MONOPHOSPHINE CATALYST

[75] Inventor: Eit Drent, Amsterdam, Netherlands

[73] Assignee: Shell Oil Company, Houston, Tex.

[21] Appl. No.: 474,953

[22] Filed: Feb. 5, 1990

[30] Foreign Application Priority Data

Mar. 29, 1989 [NL] Netherlands ................. 8900768

[51] Int. Cl.$^5$ ............................................. C08G 67/02
[52] U.S. Cl. ..................................... 528/392; 502/162
[58] Field of Search ........................................ 528/392

[56] References Cited

U.S. PATENT DOCUMENTS 3,694,412  9/1972  Nozaki ..................... 260/63 C Q
4,859,764  8/1989  Drent et al. ................... 528/392

FOREIGN PATENT DOCUMENTS 121965  10/1984  European Pat. Off. .
257663   3/1988  European Pat. Off. .
277695   8/1988  European Pat. Off. .
1081304  8/1967  United Kingdom .

Primary Examiner—Harold D. Anderson

[57] ABSTRACT

An improved process for the production of a linear alternating polymer of carbon monoxide and at least one ethylenically unsaturated hydrocarbon employs a novel catalyst composition formed from a halide-free compound of palladium, a non-hydrohalogenic acid having a pKa below 1 and a tertiary aliphatic monophosphine. The linear alternating polymers are useful as engineering thermoplastics.

12 Claims, No Drawings

5,061,785

POLYMERIZATION OF CARBON MONOXIDE/OLEFIN WITH TERTIARY ALIPHATIC MONOPHOSPHINE CATALYST

FIELD OF THE INVENTION

The present invention relates to a process for the production of a linear alternating polymer of carbon monoxide and at least one ethylenically unsaturated hydrocarbon. More particularly, the invention relates to a process for the production of the linear alternating polymer in the presence of a novel catalyst composition formed from a halide-free palladium compound, a non-hydrohalogenic acid of low pKa and a tertiary aliphatic monophosphine.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of trialkylphosphine complexes of palladium compounds as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The production of such polymers, now known as polyketones or polyketone polymers, has more recently been disclosed by a number of published European Patent Applications including 121,965, 181,014, 213,671 and 257,663. The processes generally involve the use of a catalyst composition formed from a compound of palladium cobalt or nickel, the anion of a non-hydrohalogenic acid having a pKa below 2 and a bidentate aromatic ligand of phosphorus, arsenic or antimony. The scope of the polymerization process is extensive but the generally preferred catalyst compositions for the recent processes are formed from compounds of palladium, particularly palladium alkanoates such as palladium acetates, anions of acids such as trifluoroacetic acid or p-toluenesulfonic acid and bidentate ligands of phosphorus such as 1,3-bis(diphenylphosphino)propane and 1,3-bis[di(2-methoxyphenyl)phosphino]propane.

The process of production of the linear alternating polymers according to such processes gives a good yield of polyketone polymer product having desirable properties, particularly in the presence of the methoxyphenyl-containing bidentate ligand. However, such ligands are often difficult to prepare and are expensive. It has been proposed to employ tertiary monophosphines, which are more economical, as precursors of the catalyst compositions utilized in the production of carbon monoxide/olefin polymers. The above U.K. 1,081,304 utilizes a catalyst composition formed from palladium dichloride and a trialkylphosphine. The above Nozaki patent uses a catalyst composition formed from palladium dichloride and a triarylphosphine. In copending U.S. patent application Ser. No. 135,427, filed Dec. 21, 1987, U.S. Pat. No. 4,820,802 there is disclosed a catalyst composition formed from palladium dichloride, certain strong acids and an ortho-substituted triarylphosphine. Although such processes do produce the described polymer product, it would be of advantage to provide catalyst compositions of higher catalytic activity formed from, inter alia, a tertiary monophosphine ligand.

SUMMARY OF THE INVENTION

The present invention relates to the production of linear alternating polymers of carbon monoxide and at least one ethylenically unsaturated hydrocarbon. More particularly, the present invention provides a method for the production of such linear alternating polymer employing a novel catalyst composition formed from a halide-free palladium compound, certain acids having a pKa below 1 and an aliphatic tertiary monophosphine.

DESCRIPTION OF THE INVENTION

The polyketone polymers which are produced by the process of the invention are linear alternating polymers of carbon monoxide and at least one ethylenically unsaturated hydrocarbon. Ethylenically unsaturated hydrocarbons suitable for use as precursors of the polyketone polymers have up to 20 carbon atoms inclusive, preferably up to 10 carbon atoms inclusive, and are aliphatic such as ethylene and other α-olefins including propylene, butylene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-propylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymers is that of a linear alternating polymer and the polymer will contain substantially one molecule of carbon monoxide for each mole of hydrocarbon. When the preferred terpolymers are produced according to the process of the invention there will be at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon.

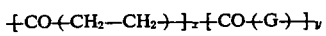

wherein G is the moiety of the second hydrocarbon of at least 3 carbon atoms polymerized through the ethylenic unsaturation and the ratio of y:x is no more than about 0.5. When the preferred copolymers are produced there will be no second hydrocarbon present and the polymers will be represented by the above formula I wherein y is zero. When y is other than zero, i.e., terpolymers are produced, the —CO-(-CH₂CH₂-)- units and the —CO-(-G-)- units are found randomly throughout the polymer chain and the preferred ratio of y:x will be from about 0.01 to about 0.1. The end groups or "caps" of the polymer chain will depend upon what materials are present during the production of the polymer and whether and how the polymer was purified. However, the precise nature of the end groups will not greatly influence the properties of the polymer to any great extent so that the polymers are fairly represented by the formula for the polymer chain as depicted above.

Of particular interest are the polyketone polymers having a number average molecular weight from about 1000 to about 200,000, particularly those polymers of number average molecular weight from about 20,000 to about 90,000, as determined by gel permation chromatography. The properties of the polymers will depend in part on the molecular weight, whether the polymer is a copolymer or a terpolymer and, in the case of terpolymers, the nature of and the proportion of the second hydrocarbon present. Typical melting points of the polyketone polymers are from about 175° C. to about 300° C., more frequently from about 210° C. to about 270° C. The polymers will have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The process of the invention comprises the contacting of the carbon monoxide and hydrocarbon under polymerization conditions in the presence of the catalyst composition and an inert reaction diluent. The catalyst composition is formed from a halide-free palladium compound, an anion of a non-hydrohalogenic acid having a pKa below 1 and a tertiary aliphatic monophosphine. A variety of palladium compounds are useful as precursors of the catalyst composition provided that the compounds are free of halide ions, e.g., chloride or bromide ions. The preferred palladium compounds are palladium alkanoates such as palladium acetate, palladium propionate and palladium octanoate but particularly preferred is palladium acetate. The anion employed as a component of the catalyst composition solution is the anion of a non-hydrohalogenic acid having a pKa below 1 (measured in water at 18° C.). Suitable acids include inorganic acids such as sulfuric acid and perchloric acid as well as organic acids, e.g., carboxylic acids such as trifluoroacetic acid and trichloroacetic acid, and sulfonic acids such as p-toluenesulfonic acid and trifluoromethanesulfonic acid. The anion is typically provided to the catalyst composition in the form of the free acid but it is also useful to provide the anion as the salt of a non-noble transition metal such as the copper or nickel salt. In yet another embodiment the anion and the palladium components are provided as a single compound such as palladium p-toluenesulfonate. The quantity of anion to be supplied is from about 0.5 mol to about 200 mols of anion per mole of palladium. Preferred quantities of anion are from about 1 mol to about 100 mols of anion per mol of palladium.

The tertiary aliphatic monophosphine is preferably a trialkylphosphine of the formula $$PR_3 \qquad (II)$$

wherein R independently is alkyl of up to 10 carbon atoms inclusive but preferably has up to 6 carbon atoms inclusive. Illustrative R groups are methyl, ethyl, propyl, i-propyl, butyl, sec-butyl and hexyl. Best results are obtained when each R group of the phosphine is the same and when R is straight-chain rather than branched. Particularly preferred as the tertiary aliphatic monophosphine is tri(n-butyl)phosphine. The monophosphine is provided to the catalyst composition solution in a quantity of from about 0.5 mol to about 50 mols of monophosphine per mol of palladium. Preferred quantities of monophosphine are from about 1 mol to about 25 mols per mol of palladium.

The contacting of the carbon monoxide and hydrocarbon monomers is conducted under polymerization conditions in the presence of the catalyst composition and an inert reaction diluent. Suitable diluents include alkanols such as methanol and ethanol and methanol is preferred. Typical polymerization conditions include a reaction temperature from about 20° C. to about 200° C. but temperatures from about 30° C. to about 150° C. are more frequently employed. Suitable reaction pressures are from about 1 bar to about 200 bar, preferably from about 20 bar to about 100 bar. The polymerization is conducted in a suitable reactor and reactant/catalyst composition contact is maintained by conventional methods such as stirring or shaking. The molar ratio of carbon monoxide to ethylenically unsaturated hydrocarbon employed in the reaction mixture is from about 10:1 to about 1:10 but preferably is from about 5:1 to about 1:5. Sufficient catalyst composition is supplied to provide from about $1 \times 10^{-7}$ mol to about $1 \times 10^{-3}$ mol of palladium per mol of hydrocarbon to be polymerized.

Subsequent to polymerization the reaction is terminated by cooling the product mixture and releasing the pressure. The polymer product is obtained as a material substantially insoluble in the reaction diluent and is recovered by well known procedures such as filtration and decantation.

The polyketone products are relatively high molecular weight thermoplastics having established utility in the production of wires, cables, sheets, films and shaped articles by processing of the polyketone polymer by methods conventional for thermoplastics such as extrusion, injection molding and thermoforming. Particular applications include the production of shaped articles such as containers for food and drink and parts and housings for the automotive industry.

The invention is further illustrated by the following Comparative Examples (not of the invention) and the Illustrative Embodiment which should not be regarded as limiting.

COMPARATIVE EXAMPLE I

A copolymer of carbon monoxide and ethylene was produced by charging to an autoclave of 250 ml capacity equipped with a mechanical stirrer a catalyst composition solution comprising 50 ml of methanol, 0.1 mmol palladium acetate, 2.0 mmol of p-toluenesulfonic acid (pKa=0.7) and 0.3 mmol of triphenylphosphine. Ethylene was added until a pressure of 30 bar was reached and carbon monoxide was added until a pressure of 60 bar was reached. The autoclave and contents were then heated to 110° C. After 3 hours the reaction was terminated by cooling the autoclave and contents to room temperature and releasing the pressure. The resulting polymer product was recovered by filtration, washed with methanol and dried.

The yield of copolymer was 0.26 g, produced at a rate of 5 g of copolymer/g palladium hr.

COMPARATIVE EXAMPLE II

A copolymer of carbon monoxide and ethylene was produced by a procedure substantially similar to that of Comparative Example I except that the catalyst composition solution contained 1.0 mmol of p-toluenesulfonic acid instead of 2.0 mmol, and 0.15 mmol of tri(2-methylphenyl)-phosphine instead of triphenylphosphine.

The yield of copolymer was 2.6 g, produced at a rate of 50 g of copolymer/g palladium hr.

COMPARATIVE EXAMPLE III

A copolymer of carbon monoxide and ethylene was produced by charging to an autoclave of 250 ml capacity equipped with a mechanical stirrer 0.01 g of palladium dichloride, 0.03 g of triphenylphosphine and 4 g of acetonitrile. Ethylene was added until a pressure of 60 bar was reached and carbon monoxide was added until a total of 67 bar had been reached. The autoclave and contents were then heated to 95° C. After 19 hours the polymerization was terminated by cooling to room temperature and releasing the pressure. The polymer product was recovered by filtration.

The yield of copolymer was 0.37 g, produced at a rate of 3.2 g of copolymer/g palladium hr.

COMPARATIVE EXAMPLE IV

A procedure substantially similar to that of Comparative Example III was followed except that the autoclave was charged with 0.036 g to tri(2-methylphenyl)-phosphine instead of triphenylphosphine, the reaction temperature was 100° C. instead of 95° C. and the reaction time was 18 hours instead of 19 hours.

No polymer product was formed.

ILLUSTRATIVE EMBODIMENT

A carbon monoxide/ethylene copolymer was produced by a procedure substantially similar to that of Comparative Example I except that the catalyst composition solution contained 5.0 mmol of p-toluenesulfonic acid instead of 2.0 mmol and 0.5 mmol of tri(n-butyl)-phosphine instead of triphenylphosphine, ethylene was added until a pressure of 20 bar was reached and carbon monoxide until a total of 40 bar was reached, and the reaction time was 2.5 hours instead of 5 hours.

The yield of copolymer was 4.0 g, produced at a rate of 150 g of copolymer/g palladium hr.

COMPARATIVE EXAMPLE V

The procedure of the Illustrative Embodiment was substantially repeated except that the catalyst composition solution contained 5.0 mmol of benzenephosphonic acid (pKa=1.5) instead of p-toluenesulfonic acid, the reaction temperature was 130° C. instead of 110° C. and the reaction time was 4 hours instead of 2.5 hours. The major product was 0.43 g of methyl propionate. No more than traces of polymer product were formed.

COMPARATIVE EXAMPLE VI

The procedure of Comparative Example V was substantially repeated except that 5.0 mmol of hydrochloric acid, provided as a 37.5% solution in water, was used in the catalyst composition solution instead of benzene phosphonic acid. No more than traces of polymer product were formed.

COMPARATIVE EXAMPLE VII

A carbon monoxide/ethylene copolymer was produced by charging to an autoclave of 600 ml capacity equipped with a mechanical stirrer 0.55 g of bis(triphenylphosphine)palladim dichloride and 50 ml of acetonitrile. Ethylene was added until a pressure of 60 bar had been reached and carbon monoxide was added until a total pressure of 70.5 bar had been reached. The autoclave and contents were then heated to 120° C. After 18 hours, the reaction was terminated by cooling to room temperature and releasing the pressure. The polymer product was recovered by filtration.

The yield of copolymer was 11.3 g, produced at a rate of 7.5 g of copolymer/g palladium hr.

COMPARATIVE EXAMPLE VIII

The procedure of Comparative Example VII was substantially repeated to form a carbon monoxide/ethylene copolymer except that 0.50 g of palladium dichloride and 0.58 g of tri(n-butyl)phosphine was charged to the autoclave instead of the bis(triphenylphosphine)palladium dichloride.

The yield of copolymer was 1.85 g, produced at a rate of 0.34 g of copolymer/g palladium hr.

PRODUCT ANALYSIS

The carbon monoxide/ethylene copolymers of Comparative Experiments I and II and of the Illustrative Embodiment were examined by $^{13}$C-NMR analysis. The spectra were consistent with a linear structure of alternating carbon monoxide and ethylene moieties.

What is claimed is:

1. In the process of producing a linear alternating polymer of carbon monoxide and at least one ethylenically unsaturated hydrocarbon by contacting the carbon monoxide and hydrocarbon under polymerization conditions in the presence of an inert diluent and a catalyst composition, the improvement wherein the catalyst composition is a catalyst composition formed from a halide-free palladium compound, the anion of a non-hydrohalogenic acid having a pKa less than 1 and a tertiary aliphatic monophosphine of the formula $PR_3$ wherein R independently is an alkyl of up to 10 carbon atoms inclusive.

2. The process of claim 1 wherein the palladium compound is a palladium alkanoate.

3. The process of claim 2 wherein the anion is the anion of p-toluenesulfonic acid or trifluoroacetic acid.

4. The process of claim 3 wherein the palladium alkanoate is palladium acetate.

5. The process of claim 4 wherein R is straight-chain alkyl of up to 6 carbon atoms.

6. The process of claim 5 wherein each R is n-butyl.

7. The process of claim 6 wherein the anion is the anion of p-toluenesulfonic acid.

8. In the process of producing a linear alternating polymer of carbon monoxide and ethylene by contacting the carbon monoxide and ethylene under polymerization conditions in the presence of an alkanol reaction diluent and a catalyst composition, the improvement wherein the catalyst composition is a composition formed from palladium alkanoate, the anion of a non-hydrohalogenic acid having a pKa less than 1 and a trialkylphosphine of the formula $PR_3$ wherein R is alkyl of up to 10 carbon atoms inclusive.

9. The process of claim 8 wherein R is straight-chain alkyl of up to 6 carbon atoms inclusive.

10. The process of claim 9 wherein the palladium alkanoate is palladium acetate.

11. The process of claim 10 wherein the anion is the anion of p-toluenesulfonic acid or trifluoroacetic acid.

12. The process of claim 11 wherein each R is n-butyl and the anion is the anion of p-toluenesulfonic acid.

* * * * *